July 11, 1933.  F. M. GUY  1,917,644
MOTOR SUPPORT AND FRAME CONNECTION
Original Filed Nov. 24, 1930  3 Sheets-Sheet 1
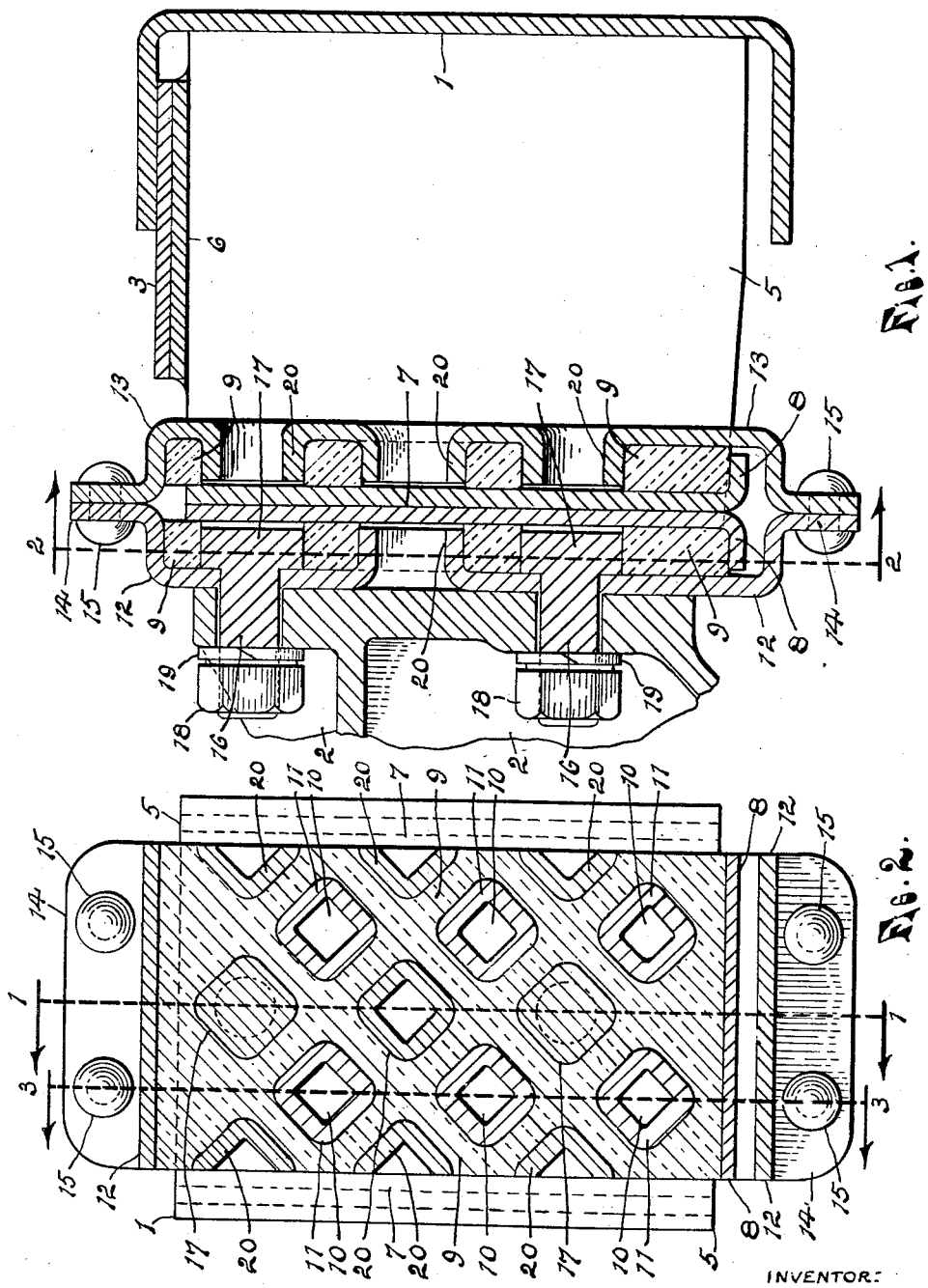
INVENTOR:
Frederick M. Guy
BY
ATTORNEY

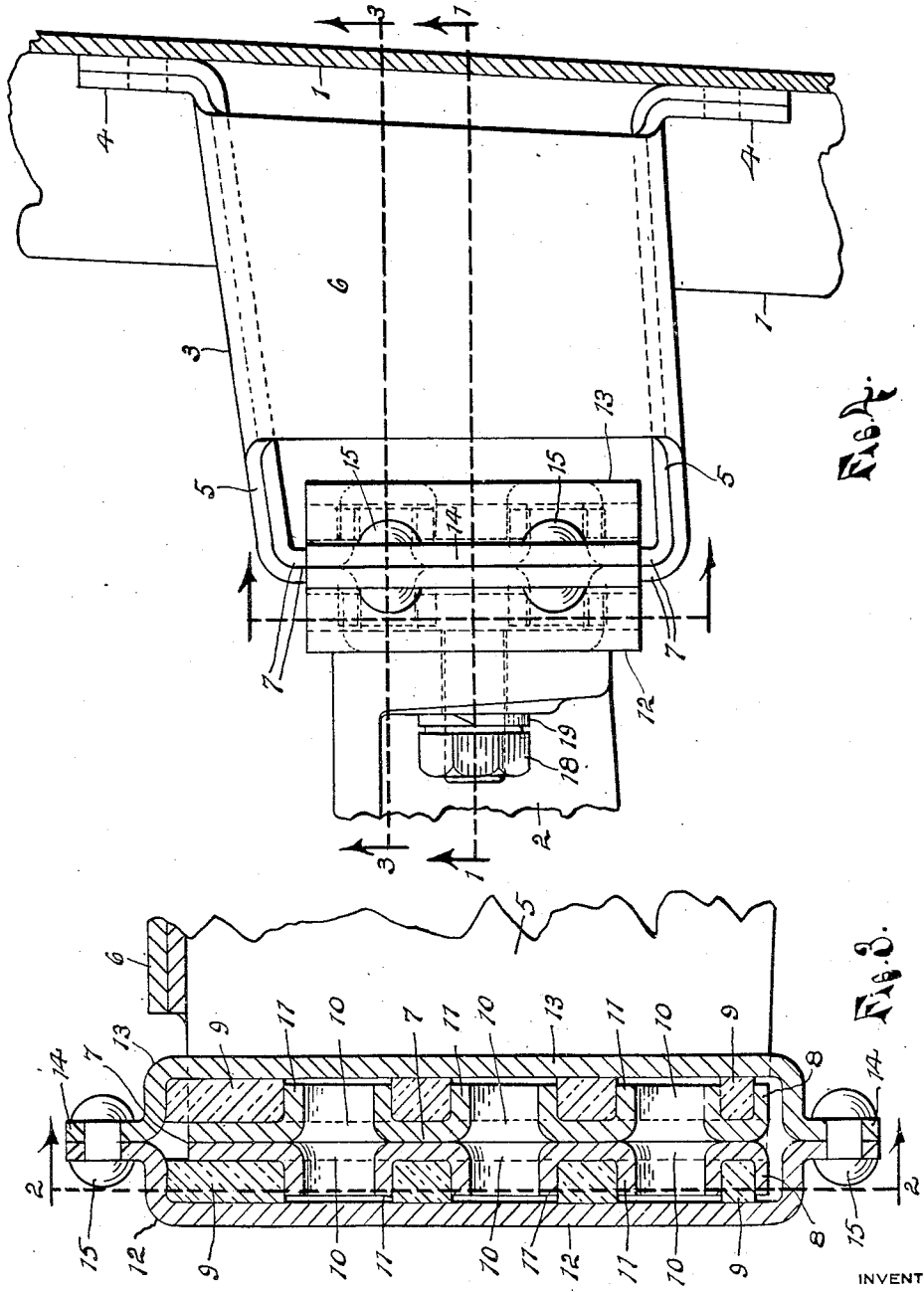

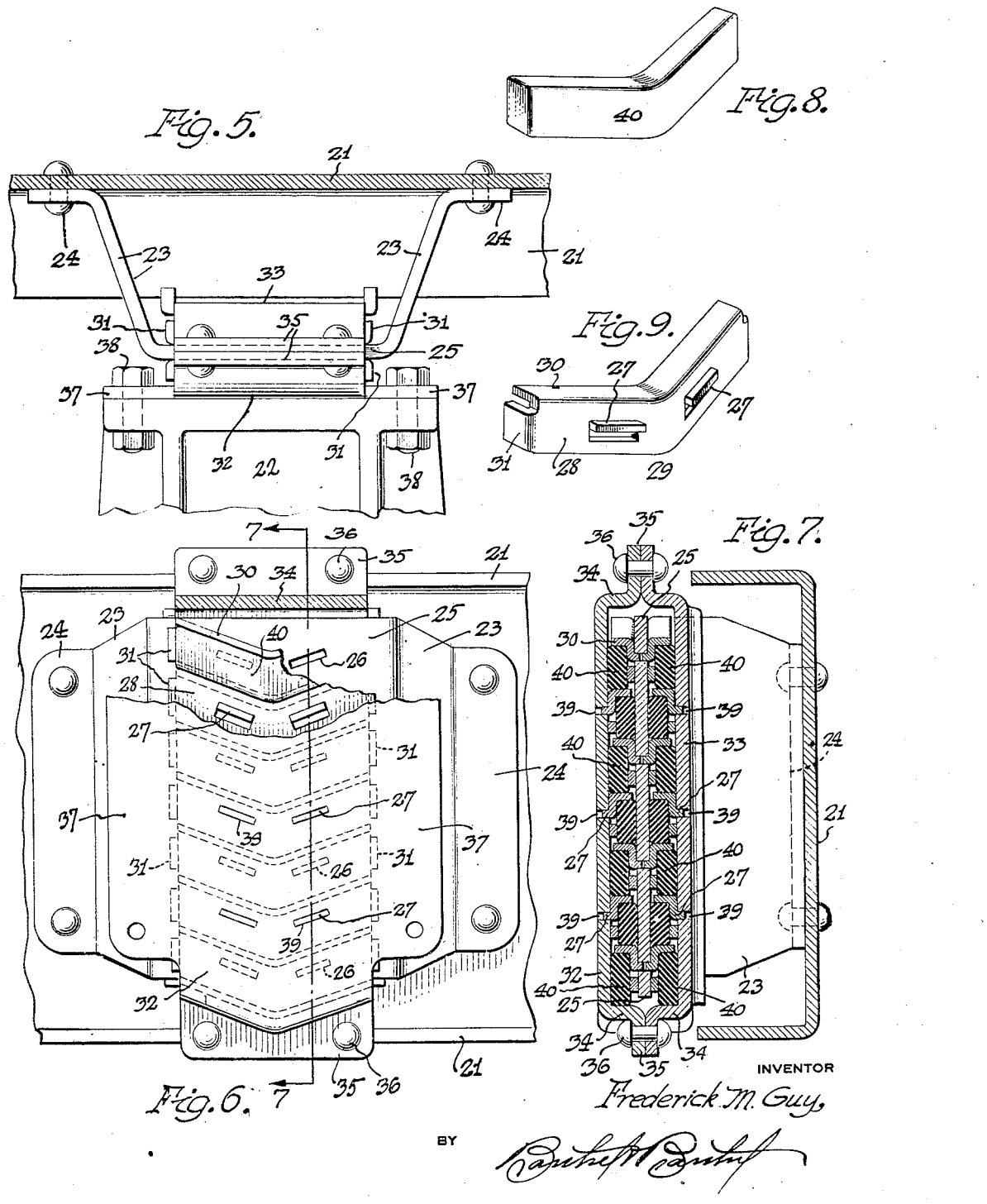

Patented July 11, 1933

1,917,644

UNITED STATES PATENT OFFICE

FREDERICK M. GUY, OF DETROIT, MICHIGAN, ASSIGNOR TO GUY AND MURTON INCORPORATED, OF DETROIT, MICHIGAN, A CORPORATION OF MICHIGAN

MOTOR SUPPORT AND FRAME CONNECTION

Application filed November 24, 1930, Serial No. 497,758. Renewed December 6, 1932.

In the construction of motor vehicles, it is found that if there be any metal to metal contact between engine and chassis frame, vibrations set up by the engine will be transmitted to the frame with resultant noise and undesirable effects, and many attempts have been made to cushion the engine upon the frame for the purpose of lessening the transmission of engine vibrations. The yielding action of engine supports must necessarily be limited and, further, the engine must be secured to the frame against any movement which would affect alignment, and in a manner to securely tie the said members of the frame together.

An object of the present invention is to provide a support for the engine upon the frame, which support is such as to positively obviate all metal to metal contact between engine and frame, thereby eliminating the transmission of any engine vibration to the frame through any metal path. A further object is to so construct such a support as to provide a strong construction embodying yieldable material so arranged and confined as to obviate disintegration and provide a positive connection between the supported and the supporting members of the device, at the same time, preferably providing an arrangement whereby may be secured a difference in the cushioning of the different relative movements between the parts and, further, provide an arrangement whereby this difference in cushioning action may be readily secured or quickly adjusted. It is also an object to so construct the device that the parts may be made at a minimum cost by the use of duplicate parts and assembly and replacement facilitated, and to so construct the support that the side members of the chassis frame are positively tied together by the engine frame without forming a metal to metal contact path, and a very strong and rigid device, simple in construction and cheap to manufacture, is provided for suspending the engine from the chassis frame.

With the above and other ends in view, the invention resides in the matters hereinafter set forth and more particularly pointed out in the appended claims, reference being had to the accompanying drawings in which—

Figure 1 is a vertical section of the device embodying the present invention, substantially upon the lines 1—1 of Figures 2 and 4;

Fig. 2 is a transverse vertical section upon the lines 2—2 of Figures 1 and 3;

Fig. 3 is a vertical section upon the lines 3—3 of Figures 3 and 4;

Fig. 4 is a plan view of the device showing the chassis frame member to which it is attached in section;

Fig. 5 is a view similar to that of Fig. 4 showing a modified construction;

Fig. 6 is an elevation, partly broken away and in section, of the inner side of the device shown in Fig. 5;

Fig. 7 is a vertical section substantially upon the line 7—7 of Figure 6;

Fig. 8 is a perspective detail of one of the rubber strips or blocks detached; and Fig. 9 is a perspective detail of one of the metal dividing and holding members for said strips.

In the construction illustrated in Figures 1 to 4 inclusive of the accompanying drawings, 1 indicates one of the side channel members of the chassis frame of a motor vehicle between which channel members the engine is usually supported upon said members by laterally extending arms usually cast integral with the engine base, the end portion of one of said engine arms being indicated as a whole, by the numeral 2. It is the usual practice to secure within the channel member 1 some form of bracket and to secure the ends 2 of the engine arms to these brackets projecting from the channel frame members with the engine thus suspended within the chassis frame between these side channels which are thus tied together by the engine base. When the engine arms are directly attached or otherwise connected to such brackets by bolts or other metal connections, vibration set up by engine operation is transmitted by this metal path, to the chassis frame, and this is true even where springs or other cushioning means is employed to yieldingly mount the engine upon or suspend it from the chassis frame.

In the present construction metal to metal contact forming a path from engine to frame which would transmit such vibrations, is entirely eliminated, blocks or pieces formed of a yielding rubber or similar composition being interposed and held in such a manner that no bolts or other connections can form such path.

This support includes a bracket 3 of any desired configuration but preferably comprising two strips of sheet metal of U-shape in plan view and with one lying within the other to provide strength and rigidity, the ends 4 of the front and rear side walls 5 being turned laterally to provide places of rigid attachment of the bracket within the channel 1, and these side walls being connected by top walls 6 to form a rigid box-like structure having a vertical end wall 7 for the attachment thereto and support of the end of the motor arm 2, the two plates forming the end wall 7 being spaced at their upper ends from the cross plates 6 and these plates of the end wall being turned laterally in opposite directions along their lower edges as at 8, providing bottom supporting flanges on this end wall of the bracket.

Applied to both inner and outer sides of wall 7 and seated at their lower ends upon the flanges 8, are blocks or strips 9 of resilient material such as rubber, and these resilient blocks or sheets are firmly secured to the inner and outer faces of the end wall 7 of the bracket by punching vertical rows of spaced apart holes 10 in each plate forming said end wall and forming a flange 11 around each hole, which flanges on one plate project laterally therefrom into corresponding holes in one of the rubber blocks and the flanges on the other plate, into holes formed in the rubber block against the other side of the bracket wall 7, these rubber facings or blocks being thus firmly connected to the bracket wall and supported against movement thereon by these flanges and by the flanges 8 engaging therebeneath.

A yoke or loop is formed of two metal strips or plates 12 and 13 to enclose the rubber blocks 9 with the bracket end wall 7 between them, these plates being formed or bent toward each other at their upper and lower ends to extend over the upper and lower ends of the blocks and end wall of the bracket where they meet with their ends turned outwardly forming end flanges 14 on the loop or yoke which are secured together by rivets 15. The metal loop thus formed by these strips or plates 12 and 13, embraces and clamps the rubber blocks between them, contacting the sides and upper ends of said blocks only, and held out of contact with the bracket wall by said blocks, the flanges 11 around the openings 10 in the plates forming the end wall 7 of the bracket, being of lesser length than the thickness of the blocks so that they do not come in contact with the plates 12 and 13. The rubber blocks therefore completely insulate the bracket from this metal supporting loop while the blocks are held firmly in place upon the inner and outer sides of the bracket wall, by the flanges 11.

To attach the arms 2 on the engine to these metal loops or to the bracket so that the engine will be suspended between the channel frame members 1, each loop is rigidly secured to the end of each arm 2 by means of bolts 16 having rectangular heads 17 within the loops with their shanks extending through holes in the plate 12 of the loop and through holes in the end of the arm 2, nuts 18 and lock washers 19 being applied to the shank ends to draw up the bolts and firmly and rigidly secure the plate 12 of the loop against the end face of the arm. The heads 17 of these bolts are of lesser thickness than the block 9 which is formed with openings to receive these heads and therefore said blocks completely insulate these bolts from the supporting bracket on the chassis frame, and the whole weight of the motor is taken by the rubber insulating blocks through the plates 12 and 13 which embrace the blocks and are completely insulated by said blocks from said bracket.

To provide a firm connection between each of the plates 12 and 13 and the rubber blocks 9 with which they are in contact throughout their face areas, flanges 20 are struck inwardly of the loop from openings in said plates, the blocks 9 being formed with openings to receive said flanges which are of lesser length than the thickness of the blocks which they engage so that these flanges will not come into contact with the wall 7 of the bracket, and these flanged holes are arranged in staggered relation to the flange holes 10 in the plates forming the end wall 7 of the bracket, the holes along the vertical side edges of the plates 12 and 13 being half holes provided with half flanges and all of the holes and their flanges in both plates 12 and 13 and those in the plates forming the end wall 7 of the bracket, being preferably of rectangular form and arranged angularly within the plates so that the bodies of the rubber blocks between the several flanges will be subjected to even compression and strains throughout their entire areas while being held in place by these flanges, relative to said plates and bracket wall.

With this construction and arrangement there is no metal to metal contact between parts carried by the chassis frame and parts carried by the engine, and, therefore, vibrations set up by engine operation will not be transmitted to the frame but will be dampened by the rubber composition insulating blocks which also provide for a very limited yielding movement of engine relative to frame due to the limited compression of these blocks over the entire area of each due to the staggered relation of the several flanges of the openings in both plates of the supporting loop and in the plates forming the end supporting wall of the bracket, said flanges being distributed over the entire areas of these plates and all projecting laterally therefrom into openings in the interposed yieldable blocks.

As the engine arms are rigidly secured to the supporting loops which embrace the end supporting walls of the brackets on the chassis frame with the rubber blocks interposed, the side channel chassis frame members 1 are securely tied together without the formation of metal to metal contact paths which would transmit vibrations from engine to chassis frame and the engine is yieldingly suspended from the frame, the insulating blocks providing for a limited relative movement while supporting the entire load of the engine.

In Figures 5 to 9 inclusive of the accompanying drawings, a simplified construction is shown and a construction which is less expensive to manufacture, and in some respects, more efficient in operation, it having certain advantages, such as certain interchangeable and easily replaceable parts and an arrangement whereby a different cushioning effect of the relative movement of the parts in one direction may be secured over the cushioning effect of the relative movement of the parts in another direction, as hereinafter more fully set forth.

In Figures 5, 6 and 7, the chassis channel frame is indicated by the numeral 21 and the end portion of the engine supporting arm, by 22. The bracket 23 may be formed from a single strip of metal bent into U-form in plan view with its ends turned outwardly to provide ears 24 for securing the bracket withing the channel of the frame as shown, but obviously this bracket may be constructed the same as shown in Figs. 1 and 4 if found desirable for the purpose of strength and rigidity, or said bracket may be secured to the end of the engine arm and the loop or yoke member secured within the channel of the frame member 21 where said channel is sufficiently deep to take said yoke, if found desirable.

The inner end wall 25 of the bracket is formed with two vertical, parallel rows of slots or elongated openings 26 with the slots of both rows inclined downwardly and with those of one row inclined oppositely to those of the other row, and these slots are provided to receive elongated lugs 27 struck out from openings in a wall 28 of a plurality of spacing and anchoring members, indicated as a whole by the numeral 29, one of which members is shown in perspective in Figure 9. Along one edge of the wall 28 of each anchoring member is an integral flange 30 extending at right angles thereto, each member being in the form of an angle bar, and each end of the wall 28 is turned at right angles forming end lugs 31. Each of these angle bars is also bent laterally intermediate its ends toward the flange 30 so that said bar in the direction of its length will conform to the inclination of the slots 26 in the wall 25 and bring its lugs 27 into position to engage in said slots, with one angle bar lying with its wall 28 flat against the surface of the wall 25 and another like bar lying flat against the opposite side of said wall with the lugs 27 on both bars engaged within the same slots 26 in the bracket wall.

To provide a yoke or loop to embrace the end wall 25 of the bracket and for attachment to the end of the motor arm 22 so that said arm will be connected to and supported by said bracket, a pair of plates 32 and 33 corresponding to the plates 12 and 13 of the construction shown in Figures 1 to 4, is provided, the end portions of these plates being offset laterally to together form an end wall 34 for each end of the loop or yoke, thus formed by said plates 32 and 33, the ends of these plates being again turned at right angles to provide ears 35 by means of which the plates may be permanently secured together with the walls 32 and 33 spaced apart a distance equal to the offsets therein which form the end walls 34 of the loop, these ears being secured together by rivets 36 passing through openings therein. The plate or wall 32 is formed with lateral extending portions which provide ears 37 formed with openings to receive bolts 38 for securing the loop or yoke formed by these plates, rigidly to the end of the motor arm 22.

The walls 32 and 33 of the loop are each formed with vertical rows of slots 39 corresponding to the slots 26 in the bracket wall 25 in size and direction of inclination but arranged intermediate said slots 26 so that they will be in proper place to receive the lugs 27 on angle bars 29 placed intermediate those bars, the lugs on which are engaged with the slots in bracket wall 25. The space at each side of the plate 25 within the loop or yoke, is thus divided into channels extending transversely of the loop by a series of angle bars all of the same construction but connected alternately to the wall 25 and to the walls 32 and 33 of the loop by means of the lugs 27 on these bars engaging the slots 26 in the plate 25 and the slots 39 in the plates 32 and 33, the flange 30 on each of the bars connected to the bracket wall 25 extending laterally from the faces of said wall to within a short distance of the inner faces of the yoke walls, and the flanges 30 on the bars connected to the loop walls, extending inwardly therefrom to near the faces of the bracket wall. These channels thus formed between said flanges on adjacent bars, are substantially rectangular in cross section but extend laterally and upwardly in an inclined direction from the central bend in each bar, and the ends of these channels are substantially closed at their ends by the end flanges or lugs 31 on the several bars.

Strips or blocks 40, one of which is shown in perspective in Figure 8, are formed of yieldable resilient material, such as rubber composition, and of a size and shape to accurately fill the several channels formed between the flanges 30 of the several bars and the inner faces of the several walls 28 of said bars and the faces of the bracket wall 25 and also the inner faces of the yoke or loop walls. Each rubber block 40 is thus securely confined in place within the yoke between it and the bracket wall, and, together these blocks insulate said bracket wall from the yoke walls so that there is no possibility of a metal contact which would transmit vibration from yoke to bracket and yet the engine supporting arm is securely attached to the frame bracket and held against movement relative thereto in any direction, with the exception of the very slight relative movement afforded by the slight yield of the several rubber blocks which will be made to prevent such yield as would allow the opposed angle bars 29 to contact each other.

As certain of the angle bars 29 are connected by their lugs to the loop or yoke walls, and the other bars are connected to the bracket wall, engine load tending to move the loop downwardly will be resisted by the several blocks seated upon the flanges 30 of the bars connected to the bracket wall, as will also be any torque or twisting strains, the several blocks being compressed transversely by said twisting movement as well as longitudinally, due to the relative angular relation of the end portions of each block or bend therein.

A great advantage in the use of a plurality of separate insulating blocks or strips over the use of two continuous pieces or strips 9 as shown in Figures 1 to 3, is that some of the blocks 40 may be formed from a different composition than others so that they will not all offer the same resistance to compression and therefore, if it be desirable to provide less resistance to compression of the rubber upon the up movement of the loop support for the engine, than upon the down movement of the loop under engine load, this difference may be provided by making those blocks which are compressed by up movement of the loop relative to the bracket wall of greater yieldability than those blocks which take the load in the opposite direction. Any desired variation in cushioning effect may therefore be secured by modifying the resiliency of certain blocks.

A very desirable feature of the construction shown in Figures 5 to 9 is that all of the angle bars 29 are exactly alike, a single stamping, thus greatly facilitating and cheapening manufacture, and as these bars are all securely confined within the engine supporting loop or yoke there will be no appreciable wear either of these bars or of the blocks 40 and none of the parts can get out of place or become broken in use.

The present construction provides a support and connection which is cheap to manufacture, being principally formed of sheet metal stampings, and which construction is such that the yieldable blocks of rubber composition are thoroughly protected against disintegration, the rubber being so confined and engaged by the relatively movable members as to evenly distribute compression thereof, and the connection of these relatively movable parts to the blocks is positive and permanent, such connection being mechanical rather than by a vulcanizing of the rubber into connection with the metal parts.

Obviously changes may be made in the construction, arrangement and combination of parts, within the scope of the appended claims without departing from the spirit of the invention, and such changes are contemplated.

Having thus fully described my invention, what I claim is:—

1. In a motor support, the combination of a bracket having an end wall, a supporting member connected to said bracket and having a wall spaced from said bracket wall, a plurality of like members in said space between said walls, certain of said members being connected to said bracket wall to move therewith and other of said members being connected to said supporting member wall to move therewith, said members being interchangeable, and resilient blocks in said space between said bracket wall and said wall of said supporting member and between adjacent members in said space, said blocks being arranged to prevent metal to metal contact between said bracket and supporting member and between said members in said space.

2. In a motor support, the combination with a supporting member, of a bracket having an end wall embraced by said supporting member, front and rear side walls and a top wall connecting said side walls, forming a box-like structure, the ends of the side walls being turned laterally to provide means for securing the bracket in operative position.

3. In a motor support, the combination of a bracket having an end wall provided with openings, a supporting member supported by said end wall and having a wall parallel with and spaced from said bracket wall and formed with openings, a plurality of insulating blocks in said space between said walls, and a series of members in said space and separating said blocks, said members having projections to engage said openings in said walls with the members of said series alternately secured to the bracket wall and to the opposed wall of said supporting member by the engagement of said projections within said openings in said walls.

4. In a motor support, the combination of a bracket having an end wall, a motor supporting member including a yoke embracing said bracket wall with a space at each side of said wall between it and the opposed walls of said yoke, a series of angle bars within each of said spaces with certain of said bars connected to said bracket wall to move therewith, the bars adjacent to said bars being connected to said yoke walls to move therewith, and a series of resilient blocks in each of said spaces and between adjacent bars, said bars having flanges extending across said spaces between said blocks.

5. In a motor support, the combination of a bracket having an end wall, a supporting member comprising parallel walls embracing said bracket wall with a space at each side of said wall between it and said walls of said supporting member, said walls having openings therein and said bracket wall having openings positioned intermediate said openings in said opposed walls, a series of angle bars in each of said spaces and formed with lugs to engage in said openings in said walls and with flanges to extend across said spaces, and a plurality of yieldable insulating blocks seated within said angle bars and filling the spaces between said bars and opposed walls.

In testimony whereof I affix my signature.

FREDERICK M. GUY.